(12) United States Patent
Baron et al.

(10) Patent No.: US 9,092,161 B2
(45) Date of Patent: Jul. 28, 2015

(54) SELECTION OF ALLOCATION POLICY AND FORMAT FOR VIRTUAL MACHINE DISK IMAGES

(71) Applicants: Ayal Baron, Kiryat Ono (IL); Saggi Y. Mizrahi, Fierberg (IL)

(72) Inventors: Ayal Baron, Kiryat Ono (IL); Saggi Y. Mizrahi, Fierberg (IL)

(73) Assignee: Red Hat Israel, Ltd., Raanana (IL)

(*) Notice: Subject to any disclaimer, the term of this patent is extended or adjusted under 35 U.S.C. 154(b) by 146 days.

(21) Appl. No.: 13/706,294

(22) Filed: Dec. 5, 2012

(65) Prior Publication Data
US 2014/0156925 A1 Jun. 5, 2014

(51) Int. Cl.
*G06F 12/00* (2006.01)
*G06F 3/06* (2006.01)
*G06F 12/16* (2006.01)
*G06F 9/00* (2006.01)

(52) U.S. Cl.
CPC ............ *G06F 3/0689* (2013.01); *G06F 3/0605* (2013.01); *G06F 3/0631* (2013.01); *G06F 3/0662* (2013.01); *G06F 3/0676* (2013.01); *G06F 9/00* (2013.01); *G06F 12/16* (2013.01)

(58) Field of Classification Search
CPC .. G06F 11/1446; G06F 11/1469; G06F 3/062
USPC .................................................. 711/162, 163
See application file for complete search history.

(56) References Cited

U.S. PATENT DOCUMENTS

| | | | | |
|---|---|---|---|---|
| 7,822,939 | B1* | 10/2010 | Veprinsky et al. | 711/170 |
| 8,046,550 | B2* | 10/2011 | Feathergill | 711/162 |
| 8,205,050 | B2* | 6/2012 | De Baer et al. | 711/162 |
| 8,370,819 | B2* | 2/2013 | Chakraborty et al. | 717/148 |
| 8,577,845 | B2* | 11/2013 | Nguyen et al. | 707/654 |
| 8,640,126 | B2* | 1/2014 | Halperin et al. | 718/1 |
| 8,682,862 | B2* | 3/2014 | Rosikiewicz et al. | 707/679 |
| 8,719,286 | B1* | 5/2014 | Xing et al. | 707/755 |
| 2014/0089916 | A1* | 3/2014 | Gross et al. | 718/1 |

OTHER PUBLICATIONS

Chahal, Sudip, et al. "Implementing cloud storage metrics to improve it efficiency and capacity management." Intel IT, IT best practices, Cloud Computing and IT Efficiency (2011).*
Yoder, Alan G. "Energy Efficient Storage Technologies for Data Centers." WEED 2010-Workshop on Energy-Efficient Design. 2010.*

* cited by examiner

*Primary Examiner* — Tuan Thai
(74) *Attorney, Agent, or Firm* — Lowenstein Sandler LLP

(57) ABSTRACT

A system and method are disclosed for selecting an allocation policy and format for storing a disk image of a virtual machine (VM). In accordance with one embodiment, a computer system that hosts a virtual machine (VM) selects an allocation policy and format for storing the disk image on a particular storage device (e.g., a magnetic hard disk, a Universal Serial Bus [USB] solid state drive, a Redundant Array of Independent Disks [RAID] system, a network attached storage [NAS] array, etc.), where the selection is based on one or more capabilities of the storage device, and on a parameter that indicates a tradeoff between performance and storage consumption.

18 Claims, 3 Drawing Sheets

SELECTION OF ALLOCATION POLICY AND FORMAT FOR VIRTUAL MACHINE DISK IMAGES

TECHNICAL FIELD

This disclosure relates to computer systems, and more particularly, to storing disk images of virtual machines.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, etc.

A virtual machine may comprise one or more "virtual processors," each of which maps, possibly in a many-to-one fashion, to a central processing unit (CPU) of the host machine. Similarly, a virtual machine may comprise one or more "virtual devices," each of which maps to a device of the host machine (e.g., a network interface device, a CD-ROM drive, etc.). For example, a virtual machine may comprise a virtual disk that is mapped to an area of storage (known as a "disk image") of a particular storage device (e.g., a magnetic hard disk, a Universal Serial Bus [USB] solid state drive, a Redundant Array of Independent Disks [RAID] system, a network attached storage [NAS] array, etc.) The hypervisor manages these mappings in a transparent fashion, thereby enabling the guest operating system and applications executing on the virtual machine to interact with the virtual processors and virtual devices as though they were actual physical entities.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
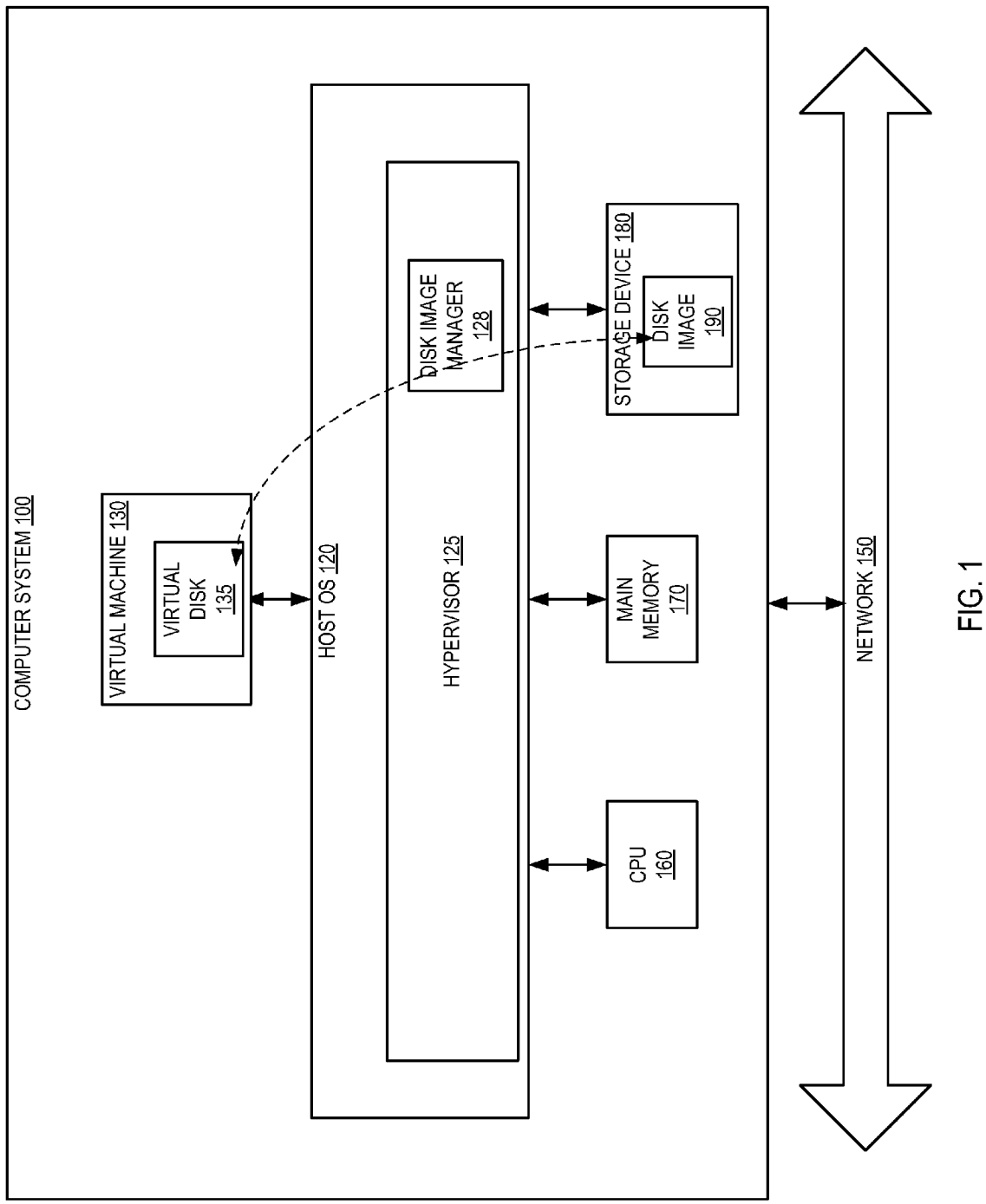
FIG. 1 depicts an exemplary computer system architecture, in accordance with an embodiment of the present invention.

Described herein is a system and method for automatically and intelligently selecting an allocation policy and format for storing a disk image of a virtual machine. More particularly, an allocation policy for storing the disk image (e.g., thin provisioning, pre-allocation, metadata pre-allocation, etc.) on a particular storage device is selected based on one or more of the following:

one or more capabilities of the storage device (e.g., snapshotting, thin provisioning, deduplication, RAID level, cloning, etc.);

one or more capabilities that the storage device lacks;

a first parameter that indicates a desired tradeoff between performance and storage consumption (e.g., specified by a system administrator, specified by a user, etc.);

a second parameter that indicates a desired tradeoff between redundancy and storage consumption (e.g., specified by a system administrator, specified by a user, etc.); or a third parameter that indicates a level of security (e.g., specified by a system administrator, specified by a user, etc.).

A format for storing the disk image (e.g., raw, qcow2, qed, vmdk, etc.) is then selected based on one or more of the following:

the selected allocation policy;

one or more capabilities of the storage device (which might be the same or different than the capabilities considered for selecting the allocation policy);

one or more capabilities that the storage device lacks;

the first parameter (desired performance/storage tradeoff);

the second parameter (desired redundancy/storage tradeoff); or the third parameter (level of security).

For example, suppose that a storage device (e.g., a magnetic hard disk, a Universal Serial Bus [USB] solid state drive, a Redundant Array of Independent Disks [RAID] system, a network attached storage [NAS] array, etc.) supports thin provisioning, which is a technique that optimizes utilization of available storage by relying on on-demand allocation of blocks of data, versus the traditional method of pre-allocating all the blocks in advance. Suppose further that this storage device does not support snapshotting, a technique that is capable of capturing and storing the entire state of a computer system as a file. If the first parameter indicates maximum performance, then pre-allocation and raw storage format might be selected to meet the performance objective, as both maximize performance at the expense of storage consumption. As another example, if a storage device supports thin provisioning and the second parameter indicates minimum storage consumption, then thin provisioning and qcow2 format (which supports compression) might be selected. As yet another example, in instances where the first parameter indicates maximum performance and the third parameter indicates minimum security, qed format (which does not support encryption) might be selected, while in other instances where the third parameter indicates maximum security, qcow2 format (which does support encryption) might be selected.

In accordance with some embodiments of the present invention, a disk image manager that runs on the host machine and that manages the execution of the virtual machine is responsible for selecting the allocation policy and storage format. Subsequently, space for the disk image is allocated on the storage device in accordance with the selected allocation policy, and the disk image is stored in the allocated space in the selected format.

Embodiments of the present invention are thus capable of automatically and intelligently selecting a suitable allocation policy and storage format for a VM disk image given the objectives and preferences of a user (specified by one or more of the three tradeoff parameters described above) and the capabilities of the particular storage device. Further, because the selection can be performed by the disk image manager, this functionality can be provided for any host operating system (OS), guest OS, and storage device, without any changes required to these systems.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "selecting", "allocating", "storing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 depicts an exemplary architecture of the salient elements of a computer system 100, in accordance with an embodiment of the present invention. One skilled in the art will appreciate that other architectures for computer system 100 are possible, and that the implementation of a computer system utilizing embodiments of the invention are not necessarily limited to the specific architecture depicted by FIG. 1.

As shown in FIG. 1, the computer system 100 comprises a central processing unit (CPU) 160, main memory 170, which may include volatile memory devices (e.g., random access memory (RAM)), non-volatile memory devices (e.g., flash memory), and/or other types of memory devices, and a storage device 180 (e.g., a magnetic hard disk, a Universal Serial Bus [USB] solid state drive, a Redundant Array of Independent Disks [RAID] system, a network attached storage [NAS] array, etc.).

The computer system 100 may be a server, a mainframe, a workstation, a personal computer (PC), a mobile phone, a palm-sized computing device, etc. Computer system 100 runs a host operating system (OS) 120, which is software that manages the hardware resources of the computer system and that provides functions such as interprocess communication, scheduling, memory management, and so forth. In one embodiment, host operating system 120 also comprises a hypervisor 125, which is software that provides a virtual operating platform for virtual machine (VM) 130 and that manages the execution of virtual machine 130.

Virtual machine 130 is a software implementation of a machine that comprises a guest operating system (not depicted in FIG. 1) and executes programs as though it were an actual physical machine. As shown in FIG. 1, virtual machine 130 comprises a virtual disk 135 that is mapped by hypervisor 125 to a disk image 190 stored by storage device 180. Hypervisor 125 manages the transfer of data between virtual machine 130 and storage device 180, and the writing and reading of data to and from disk image 190. In addition, as described in more detail below with respect to FIG. 2, hypervisor 125 may also be involved in the allocation of space on storage device 180 for disk image 190, depending on the capabilities of storage device 180 and the particular allocation policy.

In accordance with this embodiment, hypervisor 125 includes a disk image manager 128 that is capable of selecting a particular policy for allocating space on storage device 180 for disk image 190 (e.g., thin provisioning, pre-allocation, metadata pre-allocation, etc.), and of selecting a particular format for storing disk image 190 (e.g., raw, qcow2, qed, vmdk, etc.), as described in detail below with respect to FIG. 2. It should be noted that a virtual machine may have multiple disk images, and that a different allocation policy may be selected for each of the disk images. It should further be noted that when hypervisor 125 manages the execution of multiple virtual machines, disk image manager 128 is capable of selecting different policies for each disk image of each virtual machine, based on different tradeoff parameters or security requirements. It should further be noted that in some alternative embodiments, hypervisor 125 may be external to host OS 120, rather than embedded within host OS 120, or can represent the host OS 120.

Figure 2:
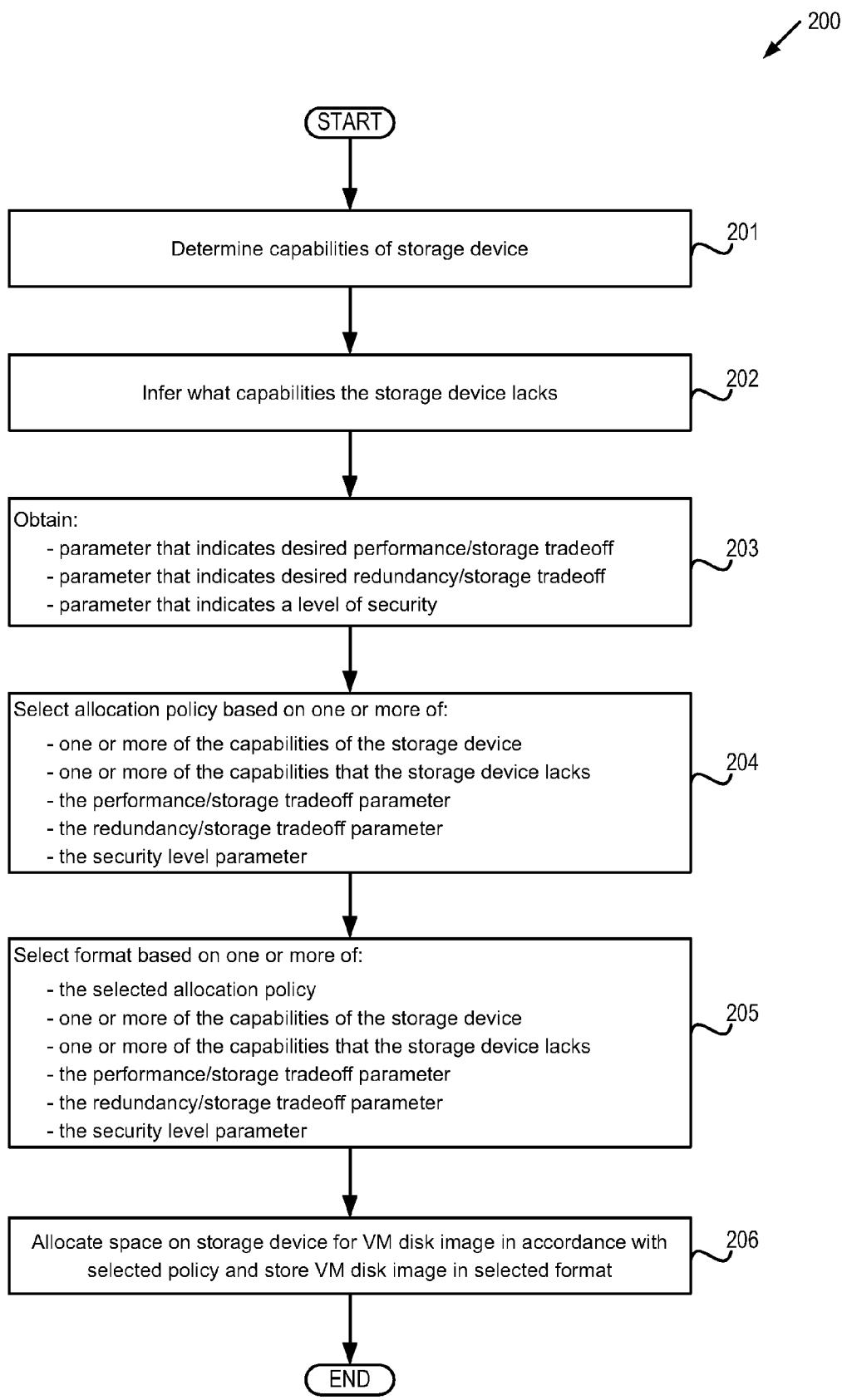
FIG. 2 depicts a flow diagram of one embodiment of a method for selecting an allocation policy and a format for storing a disk image of a virtual machine.

FIG. 2 depicts a flow diagram of one embodiment of a method 200 for selecting an allocation policy and a format for storing disk image 190 of virtual machine 130. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine. It should be noted that blocks depicted in FIG. 2 can be performed simultaneously or in a different order than that depicted.

At block 201, the capabilities of storage device 180 are determined. In one embodiment, block 201 is performed by disk image manager 128 via a system call to host operating system 120, while in some other embodiments, the capabilities of storage device 180 might be obtained in some other fashion (e.g., via a storage array native application programming interface [API], using the Storage Management Initiative Specification [SMI-S], from a metadata file, from a configuration file, via a query, by checking a version number, etc.).

At block 202, the capabilities that storage device 180 lacks are inferred by taking the complement of the set of capabilities determined at block 201, with respect to a pre-defined set of capabilities of interest.

At block 203, three parameters are obtained:
a first parameter that indicates a desired tradeoff between performance and storage consumption;
a second parameter that indicates a desired tradeoff between redundancy and storage consumption; and
a third parameter that indicates a level of security.

In one embodiment, the parameters are obtained from a user (e.g., a system administrator, etc.) via a graphical user interface (GUI)-based tool, while in some other embodiments, the parameters might be obtained in some other fashion (e.g., via a text-based configuration file, etc.). It should be noted that in one embodiment, different parameter values may be specified for different virtual machines.

In some embodiments, the first and second parameters might be binary (e.g., the first parameter might be either 'maximum performance' or 'minimum storage consumption'), while in some other embodiments the first and second parameters might be ternary (e.g., the second parameter might be either 'maximum redundancy', 'minimum storage consumption', or 'balanced'), while in yet other embodiments, the first and second parameters might be real numbers between 0 and 1 inclusive that indicate a degree of balance between the two objectives in the tradeoff (e.g., 0.5 for the first parameter would indicate an even balance between performance and storage consumption). Similarly, in some embodiments the third parameter might be binary (e.g., security is either 'on' or 'off'), while in other embodiments the third parameter might a plurality of levels, in addition to 'off', much like the different colors of U.S. terrorism alerts (e.g., red, orange, green, etc.) or the different RAID levels of a RAID system. It should be noted that, typically, there is a tradeoff between security and performance, so that a higher security level equates to lower performance.

At block 204, an allocation policy for storing disk image 190 on storage device 180 is selected based on one or more of the following:

one or more capabilities of storage device 180 (e.g., snapshotting, thin provisioning, deduplication, RAID level, cloning, etc.);
one or more capabilities that storage device 180 lacks;
the first parameter that indicates the desired tradeoff between performance and storage consumption;
the second parameter that indicates the desired tradeoff between redundancy and storage consumption; or
the third parameter that indicates the level of security.

It should be noted that in some embodiments block 204 may be performed by disk image manager 128. This arrangement advantageously enables the use of any host operating system (OS) 120, without requiring any changes to the underlying host OS code, as well as the use of any guest OS in virtual machine 130 and any type of storage device 180, again without requiring any software or firmware changes. In some other embodiments, block 204 might instead be performed by some other entity, such as by some other computer system, or by host OS 120 or some other software module executed by host OS 120, or by another software module executed by hypervisor 125, or by the guest OS or some other software module of virtual machine 130, etc.

At block 205, a format for storing disk image 190 on storage device 180 is selected based on one or more of the following:
the allocation policy selected at block 204;
one or more capabilities of storage device 180 (e.g., snapshotting, thin provisioning, deduplication, RAID level, cloning, etc.);
one or more capabilities that storage device 180 lacks;
the first parameter that indicates the desired tradeoff between performance and storage consumption;
the second parameter that indicates the desired tradeoff between redundancy and storage consumption; or
the third parameter that indicates the level of security.

It should be noted that in some embodiments, the selection of a format at block 205 may be based on the same criteria that were considered in selecting the allocation policy at block 204. For example, when an allocation policy is selected based on two particular capabilities of the storage device in combination with the performance/storage tradeoff parameter, then the format might also be selected based on the same two particular capabilities and the performance/storage tradeoff parameter.

In some other embodiments, the selection of a format at block 205 may be based only on the allocation policy selected at block 204, in which case the selection at block 205 may be thought of as being indirectly based on the criteria considered at block 204. For example, if pre-allocation is selected as the allocation policy at block 204, then raw storage format might be selected based solely on the pre-allocation policy, regardless of what criteria led to the selection of pre-allocation. In still other embodiments, the selection of a format at block 205 may be based on the selected allocation policy in combination with the criteria considered at block 204. For example, if pre-allocation is selected as the allocation policy at block 204 based on the performance/storage tradeoff parameter in combination with a lack of thin provisioning capability, then raw storage format might be selected based on the pre-allocation policy and the performance/storage tradeoff parameter.

In yet other embodiments, the selection of a format at block 205 may be based on a subset of the criteria considered at block 204, or a superset of the criteria considered at block 204, or a subset of the criteria considered at block 204 in combination with one or more additional criteria, or possibly an altogether different set of criteria than those considered at block 204. For example, an allocation policy might be selected based on one particular capability of the storage device in combination with the performance/storage tradeoff parameter, while the format might be selected based on a different capability of the storage device in combination with both the performance/storage tradeoff parameter and the redundancy/storage tradeoff parameter.

As is the case at block 204, in some embodiments block 205 may be performed by disk image manager 128, while in some other embodiments, block 204 might instead be performed by some other entity, such as by host OS 120 or some other software module executed by host OS 120, or by another software module executed by hypervisor 125, or by guest OS or some other software module of virtual machine 130, etc. It should be noted that in some embodiments blocks 204 and 205 might be performed by the same entity (e.g., disk image manager 128, etc.), while in some other embodiments blocks 204 and 205 might be performed by a different entities.

At block 206, space for disk image 190 is allocated on storage device 180 in accordance with the policy selected at block 204 and the format selected at block 205. It should be noted that in some embodiments, and depending on the policy selected at block 204, allocating space for disk image 190 may be handled solely by storage device 180, while in some other embodiments, the allocation of space may be performed at the host level instead of storage level (e.g., via an abstraction layer such as Logical Volume Manager [LVM] or a file system that provides sparse storage objects and allocates additional space when needed, etc.). It should further be noted that when the policy selected at block 204 is pre-allocation, and when a user (e.g., a system administrator of computer system 100, a user of an application running in virtual machine 130, etc.) is expected to install a file system on storage device 180 that requires a given amount of space (e.g., N bytes, where N is not necessarily the full size of the virtual disk), then storage space of at least that amount may be pre-allocated on storage device 180.

Figure 3:
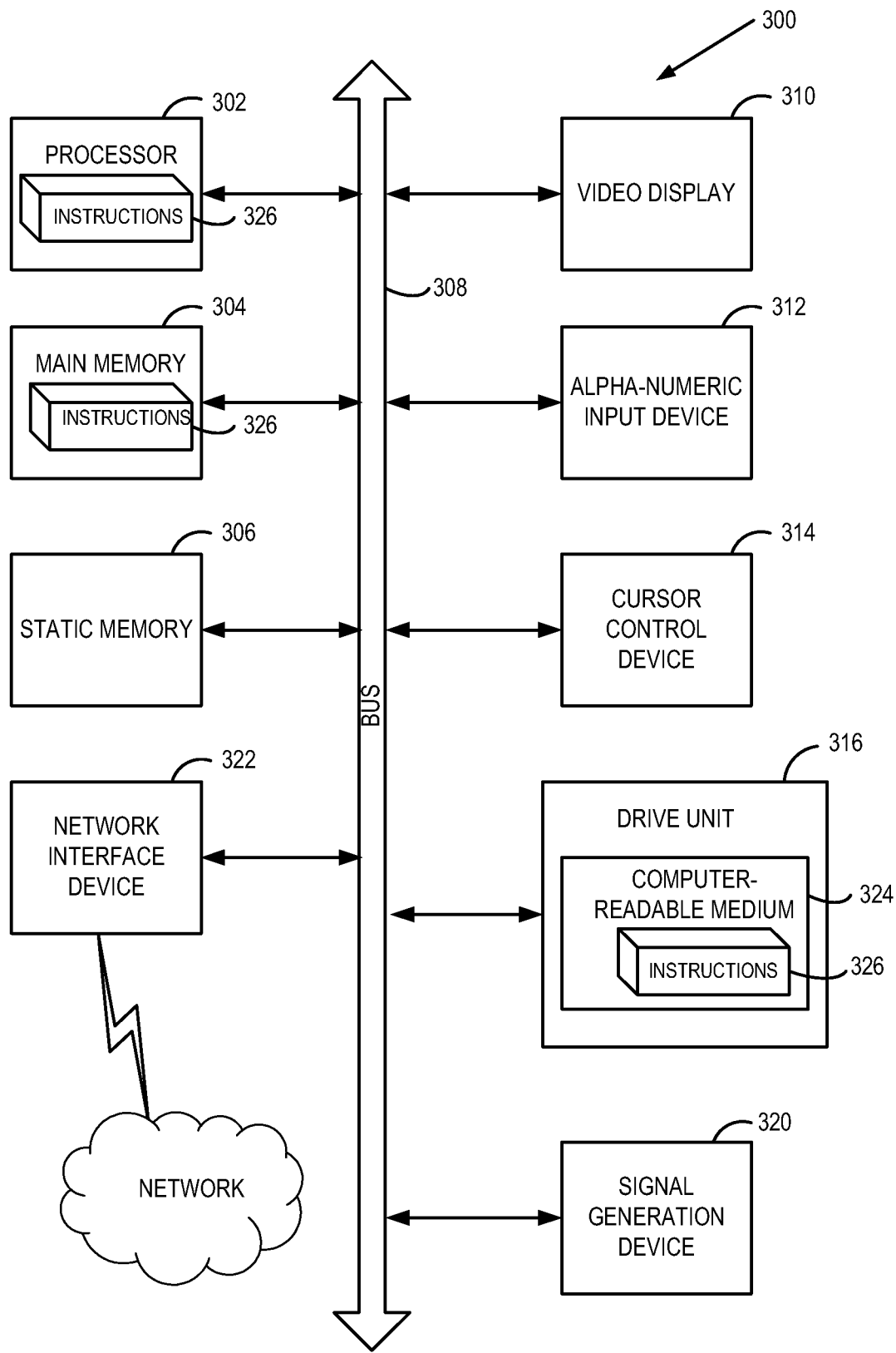
FIG. 3 depicts a block diagram of an illustrative computer system operating in accordance with embodiments of the invention.

FIG. 3 illustrates an exemplary computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processing system (processor) 302, a main memory 304 (e.g., read-only memory (ROM), flash memory, dynamic random access memory (DRAM) such as synchronous DRAM (SDRAM)), a static memory 306 (e.g., flash memory, static random access memory (SRAM)), and a data storage device 316, which communicate with each other via a bus 308.

Processor 302 represents one or more general-purpose processing devices such as a microprocessor, central processing unit, or the like. More particularly, the processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 302 may also be one or more special-purpose processing devices such as an application specific integrated circuit (ASIC), a field programmable gate array (FPGA), a digital signal processor (DSP), network processor, or the like. The processor 302 is configured to execute instructions 326 for performing the operations and steps discussed herein.

The computer system 300 may further include a network interface device 322. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 320 (e.g., a speaker).

The data storage device 316 may include a computer-readable medium 324 on which is stored one or more sets of instructions 326 (e.g., instructions corresponding to the method of FIG. 3, etc.) embodying any one or more of the methodologies or functions described herein. Instructions 326 may also reside, completely or at least partially, within the main memory 304 and/or within the processor 302 during execution thereof by the computer system 300, the main memory 304 and the processor 302 also constituting computer-readable media. Instructions 326 may further be transmitted or received over a network via the network interface device 322.

While the computer-readable storage medium 324 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   determining, by a processor, one or more capabilities of a storage device, wherein the determining is performed by a system call to a host operating system;
   determining, by the processor, one or more capabilities the storage device lacks by taking a complement of the one or more capabilities with respect to a defined set of capabilities;
   selecting, by the processor, one of a plurality of allocation policies for allocating storage on the storage device for a disk image of the virtual machine, wherein the selecting is in view of: (i) the one or more capabilities of the storage device, (ii) the one or more capabilities that the storage device lacks, and (iii) a parameter that indicates a tradeoff between performance and storage consumption; and allocating storage for the disk image on the storage device in accordance with the selected policy.

2. The method of claim 1 wherein the one or more capabilities of the storage device comprises snapshotting.

3. The method of claim 1 wherein the parameter indicates one of maximum performance and minimum storage consumption.

4. The method of claim 1 wherein the plurality of allocation policies comprises thin provisioning.

5. The method of claim 1 further comprising selecting a format for storing the disk image on the storage device, in view of at least one of: the parameter, or the one or more capabilities of the storage device.

6. The method of claim 1 wherein the selecting is also in view of: (iv) a parameter that indicates a tradeoff between redundancy and storage consumption.

7. The method of claim 1, further comprising:
selecting by the processor, in view of the selected allocation policy for allocating storage on the storage device, one of a plurality of formats for storing the disk image on the storage device; and
storing the disk image on the storage device in the selected format.

8. The method of claim 1 wherein the one or more capabilities of the storage device comprises Redundant Array of Independent Disks (RAID) level.

9. The method of claim 1 wherein the plurality of allocation policies comprises metadata pre-allocation.

10. An apparatus comprising:
a memory to store a virtual machine, the virtual machine comprising a virtual disk; and
a processor to:
determine one or more capabilities of a storage device, wherein the determining is performed by a system call to a host operating system;
determine one or more capabilities the storage device lacks by taking a complement of the one or more capabilities of the storage device with respect to a defined set of capabilities;
select one of a plurality of formats for storing a disk image of the virtual disk on the storage device, wherein the selecting is in view of: (i) the one or more capabilities of the storage device, (ii) the one or more capabilities that the storage device lacks, and (iii) a parameter that indicates a tradeoff between performance and storage consumption; and
store the disk image on the storage device in the selected format.

11. The apparatus of claim 10 wherein the one or more capabilities of the storage device comprises deduplication.

12. The apparatus of claim 10 wherein the parameter indicates a balance of performance and storage consumption.

13. The apparatus of claim 10 wherein the plurality of allocation policies comprises a pre-allocation policy.

14. The apparatus of claim 13 wherein a user is to install on the storage device a file system that requires a given number of bytes, and wherein the pre-allocation policy pre-allocates storage space on the storage device having a size that is at least as large as the given number of bytes.

15. A non-transitory computer readable storage medium, having instructions stored therein, which when executed, cause a processor that hosts a virtual machine to:
determine, by the processor, one or more capabilities of a storage device, wherein the determining is performed by a system call to a host operating system;
determine one or more capabilities the storage device lacks by taking a complement of the one or more capabilities of the storage device with respect to a defined set of capabilities;
select one of a plurality of allocation policies for allocating storage on the storage device for a disk image of the virtual machine, wherein the selected policy is in view of: (i) the one or more capabilities of the storage device, (ii) the one or more capabilities that the storage device lacks, and (iii) a parameter that indicates a tradeoff between storage consumption and redundancy; and
allocate storage for the disk image on the storage device in accordance with the selected policy.

16. The non-transitory computer readable storage medium of claim 15, wherein the parameter indicates one of minimum storage consumption and maximum redundancy.

17. The non-transitory computer readable storage medium of claim 15, the processor further to
select a format for storing the disk image on the storage device, wherein the selection is in view of at least one of: the parameter, or the one or more capabilities of the storage device.

18. The non-transitory computer readable storage medium of claim 15 wherein the selected policy is also in view of: (iv) a parameter that indicates a security level.

* * * * *